United States Patent Office 3,538,023
Patented Nov. 3, 1970

3,538,023
ELECTRICALLY CONDUCTIVE ZINC OXIDE
Robert S. Bowman, Pittsburgh, Pa., assignor to St. Joseph Lead Company, New York, N.Y., a corporation of New York
No Drawing. Filed July 28, 1967, Ser. No. 656,705
Int. Cl. H01b *1/06*
U.S. Cl. 252—518                                  6 Claims

ABSTRACT OF THE DISCLOSURE

Normally non-conductive zinc oxide is converted into an electrically conductive form by heating the zinc oxide in a non-oxidizing atmosphere in admixture with an oxide of germanium or tin or a precursor thereof convertible into such oxide under the conditions of treatment.

---

The invention relates to the production of electrically conductive zinc oxide.

I have found that normally non-conductive zinc oxide, either French or American process, can be converted into an electrically conductive form by heating the zinc oxide for a relatively short time to a temperature in the range of from about 600° C. to about 900° C. in admixture with an oxide of germanium or tin or a precursor thereof convertible into such oxide under the conditions of treatment. Preferably the heating is carried out in a reducing atmosphere, except when germanium or the lower valence oxides of germanium or tin are used, in which case the use of a non-oxidizing atmosphere such as nitrogen or argon is sufficient to convert the zinc oxide to an electrically conductive form.

The activating substances are used in relatively small proportions of the order of from about 0.01 to about 5.0 atom percent based on the zinc oxide and, in general, amounts of the activating substances in the range of from about 0.03 to about 1.0 atom percent are preferred. The oxides or their precursors may be mixed with the zinc oxide in the dry form prior to the heating operation. Preferably such mixtures are sprayed with water in the mixer in an amount, for example, of about 5 parts by weight of water to 20 parts by weight of the mixture to give a damp powder which is dried in air before being heated. When water soluble precursors, such as stannous sulfate, are used they are preferably dissolved in water, for example, in about 5 parts by weight of water to 20 parts by weight of zinc oxide, and the solution sprayed on the zinc oxide in a mixer to give a damp powder which is then air dried before being heated.

The mixture of zinc oxide and activating agent is heated to the desired temperature in a neutral or reducing atmosphere. The heating may be carried out in refractory reactor tubes either batchwise or in continuous flow through the reactor tubes. In general, a heating period of about 15 minutes is sufficient. The product is preferably allowed to cool to room temperature in the neutral or reducing atmosphere.

The neutral atmosphere may be argon or nitrogen and the reducing atmosphere may be hydrogen or carbon monoxide or a mixture of nitrogen with hydrogen or carbon monoxide, for example, in the proportion of from about 5 to about 50 mole percent of hydrogen or carbon monoxide.

The following table gives illustrative examples of the method of the invention carried out with various activating agents and under various conditions:

| Activator | Atom, percent activator | Processing Temp., °C. | Processing Atmosphere | D.C. resistivity, ohm-cm. |
|---|---|---|---|---|
| GeO$_2$ | 0.57 | 650 | Hydrogen | 51 |
| GeO$_2$ | 0.40 | 800 | ---do--- | 3 |
| GeO$_2$ | 0.28 | 800 | ---do--- | 2 |
| GeO | 0.80 | 800 | ---do--- | 2 |
| GeO | 0.80 | 800 | Nitrogen | 4 |
| GeO | 0.57 | 750 | Hydrogen | 30 |
| GeO | 0.57 | 750 | Nitrogen | 5.1×10$^2$ |
| Ge* | 0.4 | 800 | Hydrogen | 29 |
| Ge* | 0.4 | 600 | Nitrogen | 7.5×10$^3$ |
| Ge* | 0.4 | 800 | ---do--- | 19 |
| GeO$_2$ | 0.15 | 750 | Nitrogen-carbon monoxide | 4 |
| SnO$_2$ | 0.34 | 700 | Hydrogen | 3.9×10$^3$ |
| SnO$_2$ | 0.34 | 900 | ---do--- | 3.9×10$^3$ |
| SnO | .55 | 800 | Nitrogen | 7.8×10$^2$ |
| SnO | 0.76 | 800 | Hydrogen | 3.8×10$^2$ |
| SnO$_4$ | 0.76 | 800 | ---do--- | 4.0×10$^2$ |
| SnSO$_4$ | 0.6 | 900 | Nitrogen-hydrogen | 66 |

\* Fine divided (−200 mesh) germanium metal powder.

The term "atom percent" as used in the specification and claims hereof designates the atoms of activator metal per 100 molecules of zinc oxide.

I claim:
1. A method of preparing electrically conductive zinc oxide which comprises heating zinc oxide to a temperature of from about 600° C. to about 900° C. in a non-oxidizing atmosphere in admixture with an oxide of a metal of the group consisting of germanium and tin or a precursor thereof convertible into such oxide under the conditions of treatment in an amount equivalent to from about 0.01 to about 5.0 atom percent based on the zinc oxide.

2. A method of preparing electrically conductive zinc oxide as defined in claim 1 wherein the amount of oxide or precursor thereof is equivalent to from about 0.03 to about 1.0 atom percent based on the zinc oxide.

3. A method of preparing electrically conductive zinc oxide as defined in claim 1 wherein the activating substance is GeO or a precursor thereof convertible to GeO under the conditions of treatment.

4. A method of preparing electrically conductive zinc oxide as defined in claim 1 wherein the activating substance is SnO or a precursor thereof convertible to SnO under the conditions of treatment.

5. A method of preparing electrically conductive zinc oxide as defined in claim 1 wherein the non-oxidizing atmosphere includes hydrogen.

6. A method of preparing electrically conductive zinc oxide as defined in claim 1 wherein the non-oxidizing atmosphere includes carbon monoxide.

References Cited

UNITED STATES PATENTS

| 2,887,632 | 5/1959 | Dalton | 252—512 |
| 3,089,856 | 5/1963 | Cyr | 252—501 |
| 3,264,229 | 8/1966 | Klein | 252—518 |

DOUGLAS J. DRUMMOND, Primary Examiner

U.S. Cl. X.R.

106—296; 23—147